(12) United States Patent
Raghuraman et al.

(10) Patent No.: US 7,171,464 B1
(45) Date of Patent: Jan. 30, 2007

(54) METHOD OF TRACING DATA TRAFFIC ON A NETWORK

(75) Inventors: Melur K. Raghuraman, Redmond, WA (US); Venkataraman Ramanathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/490,981

(22) Filed: Jan. 24, 2000

Related U.S. Application Data (60) Provisional application No. 60/140,581, filed on Jun. 23, 1999.

(51) Int. Cl.
*G06F 15/16* (2006.01)
(52) U.S. Cl. ..................................... 709/224; 709/228
(58) Field of Classification Search ........ 709/102–107, 709/229, 223–226, 249, 227, 228, 237, 203; 710/5
See application file for complete search history.

(56) References Cited

U.S. PATENT DOCUMENTS

| | | | | |
|---|---|---|---|---|
| 4,630,196 A | * | 12/1986 | Bednar et al. ............... | 709/202 |
| 5,303,166 A | * | 4/1994 | Amalfitano et al. ......... | 702/186 |
| 5,365,514 A | * | 11/1994 | Hershey et al. ............. | 370/241 |
| 5,958,010 A | * | 9/1999 | Agarwal et al. ............. | 709/224 |
| 5,978,849 A | * | 11/1999 | Khanna ....................... | 709/227 |
| 6,141,686 A | * | 10/2000 | Jackowski et al. ........... | 709/224 |
| 6,167,445 A | * | 12/2000 | Gai et al. .................... | 709/223 |
| 6,175,914 B1 | * | 1/2001 | Mann ........................... | 712/227 |
| 6,269,410 B1 | * | 7/2001 | Spasojevic .................... | 710/5 |
| 6,314,530 B1 | * | 11/2001 | Mann ........................... | 714/38 |
| 6,449,615 B1 | * | 9/2002 | Liu et al. ..................... | 707/10 |
| 6,493,837 B1 | * | 12/2002 | Pang et al. ................... | 714/45 |

OTHER PUBLICATIONS

J.P. Buzen, A.W. Shum, "Beyond Banwidth-Mainframe Style Capacity Planning for Networks and Windows NT" Conference Proceedings CMG 96. pp. 479-485.
J.P. Buzen, A.W. Shum, "Considerations for Modeling Windows NT", Conference Proceedings CMG 97. pp. 219-230.
Jee Fung Pang, "Capacity Planning for Windows NT: Event Tracing and Instrumentation", CMG 97 Late Breaking Paper. CMG Transactions Issue 94, Apr. 1998, pp. 41-44.
David A. Solomon, Inside Windows NT (Second Edition), Microsoft Press 1998.
Glen Clark, "Networking in Microsoft Windows NT", MSDN Technical Articles, May/Jun. 1993.
Samson, Steve, editor; *CMG Transactions*, Issue Ninety-four, Apr. 1998.
"Introduction to TCP/IP", MSDN Library Sep. 1998 (printed from http://msdn.microsoft.com/library/en-us/dniph/html/tcpipintro.asp?frame=true on Mar. 26, 2003).

* cited by examiner

*Primary Examiner*—Saleh Najjar
*Assistant Examiner*—David Lazaro
(74) *Attorney, Agent, or Firm*—Marshall, Gerstein & Borun LLP (57) ABSTRACT

A method of tracing data on a network that detects receive and send events in a protocol stack is provided. The method provides key information for capacity planners for correctly charging network traffic to the individual services and applications. The TCP/IP stack is instrumented at the transport layer, so that Input/Output Request packets (IRP) representing sends and receives can be detected as they pass through the stack. When such packets are detected an appropriate send or receive event is recorded in a trace log.

25 Claims, 5 Drawing Sheets

METHOD OF TRACING DATA TRAFFIC ON A NETWORK

CROSS REFERENCE TO RELATED APPLICATIONS

This application claims the benefit of U.S. Provisional Application No. 60/140,581, filed on Jun. 23, 1999.

TECHNICAL FIELD OF THE INVENTION

This invention relates generally to event tracing and more particularly to a method of tracing data traffic on a network.

BACKGROUND

In this client/server world of computing that we live in today, capacity planning activity is just not limited to the server but to the entire system including the clients, servers and network devices. In the past, network capacity planners have treated the systems without serious concern and system capacity planners have in turn ignored the network devices in their analysis. One major reason for this is the lack of appropriate performance data to tie the two worlds and the fear of overhead of instrumentation.

Accuracy of model input metrics is often cited as the key indicator of the validity of a capacity analysis. In the last couple of years, there have been several papers mentioning the lack of performance data in MICROSOFT WINDOWS NT brand operating system mainly for Capacity Planning. These concerns were addressed by introducing an Event Tracing Facility in the WINDOWS NT 5.0 brand operating system and published the event tracing API. While it addressed system data requirements adequately, data related to network was lacking.

With internet access becoming common place today, there is no drop in the appetite for network bandwidth for web based applications. In fact, high speed networking is a very important focus of WINDOWS NT 5.0 brand operating system which already achieves 1 to 2 Gbps throughput. With network speeds getting this fast, any instrumentation must be highly optimized to take minimal overhead.

Most capacity planning efforts for networks have treated the system as a source generator and focused on frame counts and frame bytes by listening to the wire. Some have employed smart ways of identifying the application responsible for network traffic by scanning the packet headers. These methods are expensive and arbitrary.

SUMMARY OF THE INVENTION

To solve the aforesaid problems, a method of tracing data traffic on a network is provided herein. According to the method, trace instrumentation of the TCP/IP stack provides key information for capacity planners for correctly charging network traffic to the individual services and applications. The TCP/IP stack is instrumented at the transport layer, so that Input/Output Request packets (IRP) representing sends and receives can be detected as they pass through the stack. When such packets are detected an appropriate send or receive event is recorded in a trace log.

DETAILED DESCRIPTION OF THE PREFERRED EMBODIMENTS

Event Tracing in WINDOWS NT 5.0 Brand Operating System

The next version of MICROSOFT WINDOWS NT brand operating system operating system will have a uniform framework for event tracing, specifically for capacity planning. The event tracing mechanism implements a circular buffer pool maintained by the operating system and an API set for Trace Providers, Consumers and Management Control. The trace logger can accept data from kernel mode device drivers and user mode applications.

In addition to providing a facility to log trace data for applications, the WINDOWS NT brand operating system kernel has been instrumented to provide key capacity planning metrics that were not available through the commonly used performance tool 'Perfmon'. The following system events are instrumented:

1. Process Creation/Deletion event. The ProcessId, parent process Id, Security Id and the Image File name are recorded.
2. Thread Creation/Deletion event. The Thread Id and its process Id are also recorded.
3. Hard Page fault event. The disk signature and the size of the first disk read resulting from the page fault are also recorded.
4. Disk Read/Write event. The disk signature and the size of the operation are recorded.

Multiple logger streams may be active at one time, typically one for the kernel logger and one for each of the trace-enabled applications running on a server. The Consumer APIset makes it easy to process the trace from multiple logger streams in the proper order and returned to the caller one event at a time.

Networking Architecture in WINDOWS NT Brand Operating System

Figure 1:
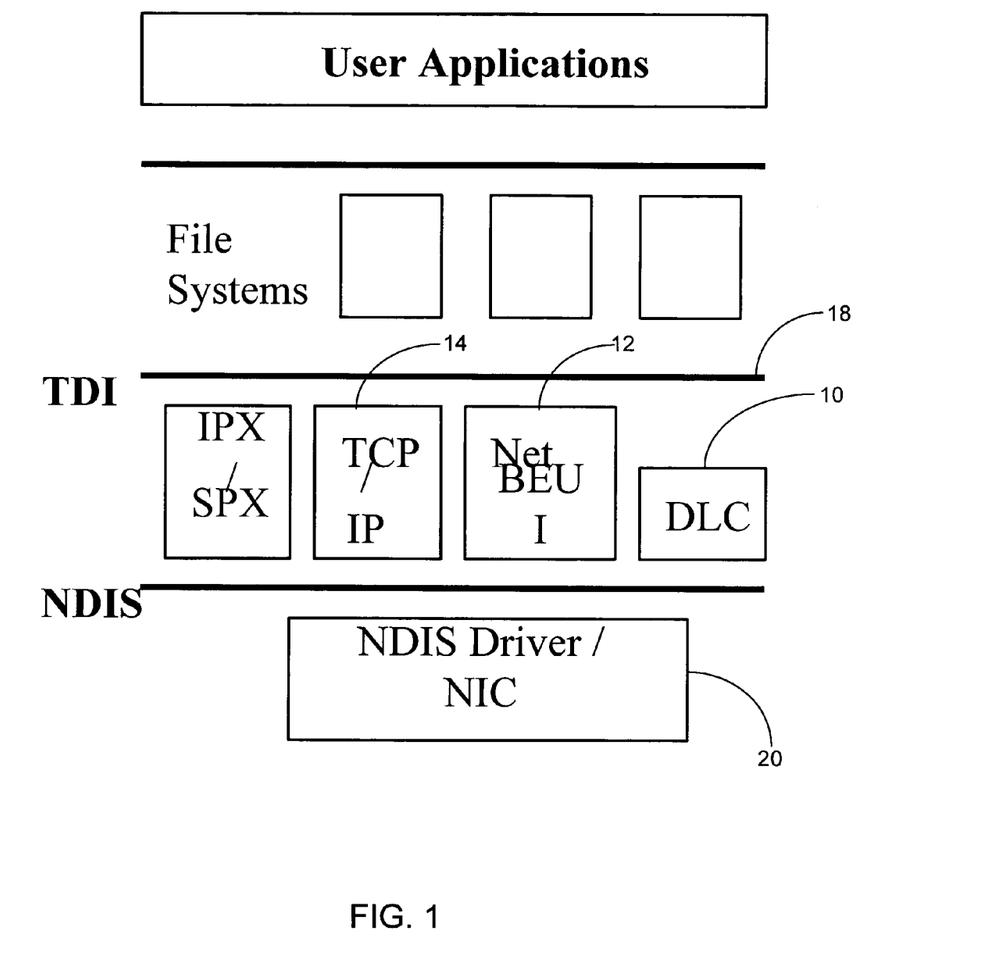
FIG. 1 shows the network layers of the WINDOWS NT brand operating system.

Networking capabilities are built into WINDOWS NT brand operating system and it is organized as layers as shown in FIG. 1.

WINDOWS NT brand operating system networking components include:

Transport protocols (DLC 10, NetBEUI 12, NWLink, and TCP/IP 14) define the rules governing communications between two computers.

Inter-process communication (IPC) components, such as named pipes and mail slots, allow applications to communicate with each other over a network.

File and Print sharing components allow resources to be made available on a network.

The Multiple uniform naming convention (UNC) Provider (MUP) and Multi-Provider Router (MPR) make it possible to write applications that use a single API to communicate using any network vendor's redirector.

There are two boundary layers in the architecture, namely the Network Driver Interface Specification (NDIS) 16 and Transport Driver Interface (TDI) 18. The NDIS layer provides the interface and a wrapper to the Network Interface Card (NIC) device drivers 20. The TDI boundary layer 18 provides a common interface specification to communicate with various transport drivers. While several protocols are supported in the transport layer, TCP/IP 14 forms the main focal point for all networking activity.

The protocol suite benefits from years of research and is the most favored suite in the Internet. In the WINDOWS NT brand operating system, several services make use of TCP/IP stack, most notably File/Print services and Socket-based applications. Most services require reliable data transmission and use TCP/IP suite for end to end reliable delivery. The File/Print services and Sockets will be explained in more detail in the next section.

File and Print Services

Figure 2:
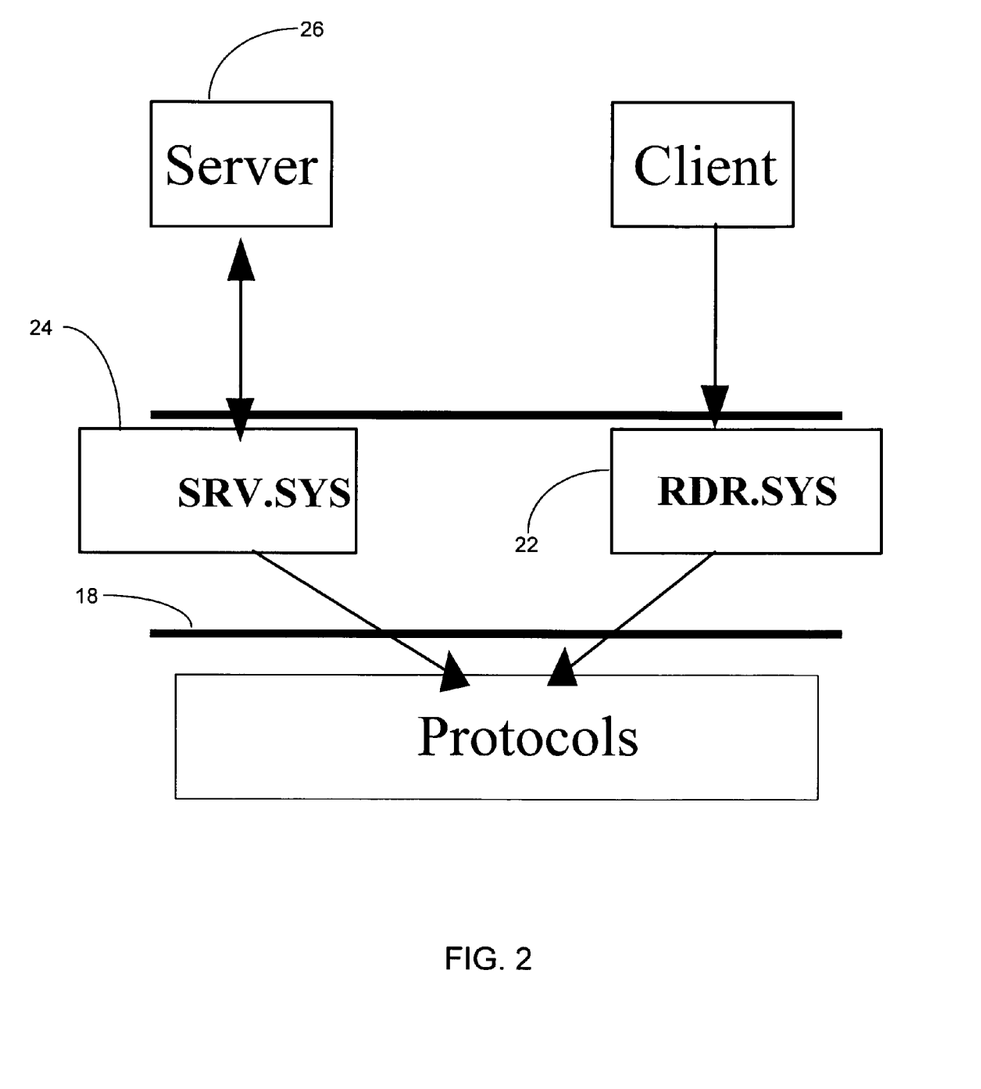
FIG. 2 shows the server and workstation services.

The File and Print services are supported by two services (Redirector and Server) that are layered on top of Transport Driver Interface layer 18 as shown in FIG. 2. They provide an encapsulation over the file system and network transparency for applications accessing remote files.

When a process on a WINDOWS NT brand operating system tries to open a file that resides on a remote computer, the following steps occur:

The process calls the I/O Manager to request that the file be opened.

The I/O Manager recognizes that the request is for a file on a remote computer, so it passes it to the redirector file system driver 22 (RDR.Sys).

The redirector 22 passes the request to lower-level network drivers that transmit it to the remote Server 26 for processing.

The transport receives a send 10 request packet (Irp) for the SMB header and command.

This send is translated into frames and queued for dispatch on the wire through the Miniport driver.

On the remote WindowsNT server system, when the server service receives a request from a remote computer asking it to read a file that resides on the hard disk, the following steps occur:

The low-level network drivers receive the request and pass it to the server driver 24 (SRV.SYS).

The server 26 passes a file read request to the appropriate local file system driver.

The local file system driver calls lower-level disk device drivers to access the file.

The data is passed back to the local file system driver.

The local file system driver passes the data back to the server 26.

The server 26 passes the data to the lower-level network drivers for transmission back to the client computer 28.

Socket-based Applications

Figure 3:
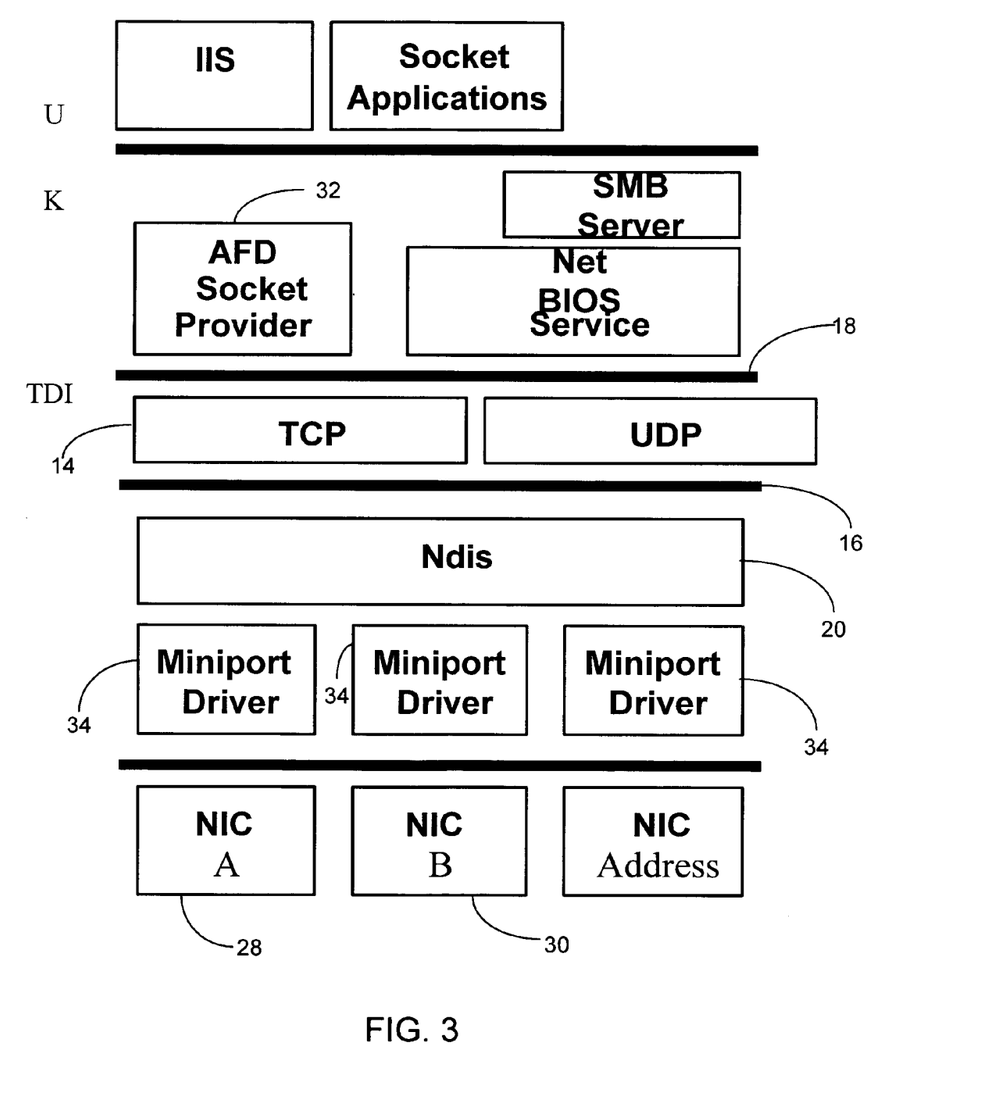
FIG. 3 shows the TCP/IP stack.

Socket-based applications are supported through the Windows Socket Provider (WinSock). FIG. 3 shows the relationship between various modules and TCP/IP.

A Socket based user application that would like to provide a service on port P (pre-advertised) to all clients would open up a socket through WinSock and listen on the socket for connection requests. This would translate as an address object with TCB structures listening on that port with the server's IP address(es) and a wild-card IP address to denote client addresses.

When a client requests a connection, a frame comes in on one of the NICs 28 and 30 (with the client's IP address and connecting port #) and is tied to one of these TCB structures. TCP calls across TDI 18 to indicate to the socket provider, which in turn calls into the User's service application for acceptance. Once accepted, frames are received and sent on the NIC involved in the connection. Though the physical NIC through which the connection data is routed can change over time, the IP addresses and port numbers don't change and lend themselves as connection context for event tracing.

The user application requests a Send to the socket service provider with a pointer to the data. The socket provider, namely AFD 32 will lock the pages in memory and request TCP 14 across TDI 18 to send. TCP 14 cuts the requests to frames and calls the miniport driver 34 corresponding to the NIC through which the data needs to be transmitted. The Miniport driver sends the frames and calls to TCP 14 to complete each frame-send event. The TCP requests are processed asynchronously as a rule, and could happen in the context of the system thread dispatched by the socket provider or a DPC (Deferred Procedure Call) from Ndis.

In the case of receive, the miniport driver 34 services the interrupt and through Ndis 20, queues a DPC to process the frame. This DPC identifies the protocol stack and calls the appropriate Receive Event handler. When this thread executes TCP Receive routine in its context, the data is indicated up or is filled in pre-posted receive buffers from the application.

Event Tracing Sends/Receives

A TCP Send needs to be traced at the end of the send. The end of a send is marked by the processing of an ACK (acknowledgement) from the other connection endpoint corresponding to the last byte of the send. Through TDI, TCP receives an IoRequestPacket (IRP) from AFD with a pointer to a locked user buffer/locked set of pages from a file's cached view. TCP creates a Send-Request structure, which caches this IRP, splits the data into frames, and sends them across. When the last ack (ack acknowledging the last byte sent) arrives, part of receive processing involves queuing the corresponding Send-Request for completion. When the completion queue is processed, the cached IRP is completed to the upper layer.

Figure 4:
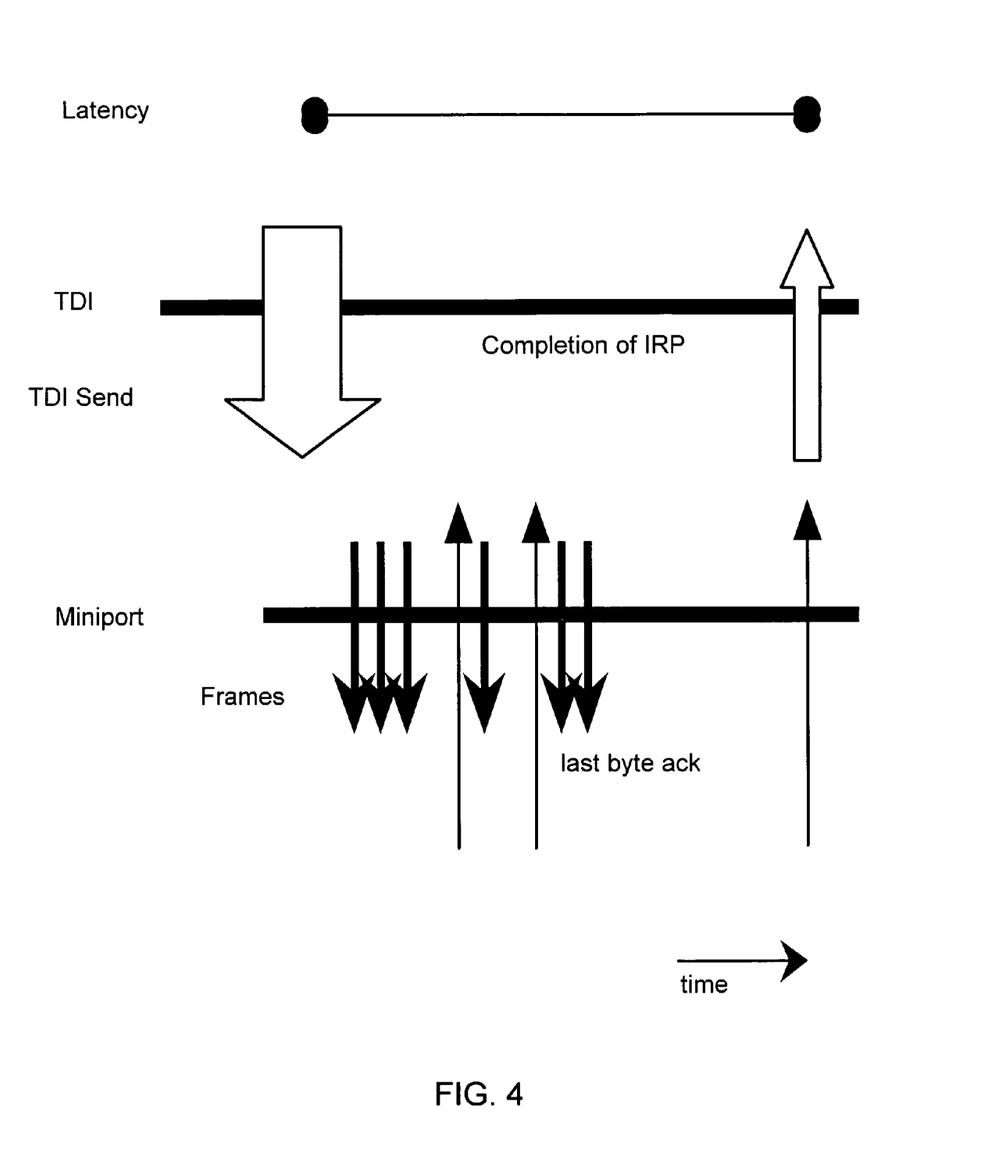
FIG. 4 is a timeline of a TCP send.

Between the initiation of the Send and the completion, several copies of the data could get transmitted due to retransmissions, or the send could get cancelled, in which case, a completion doesn't occur. In FIG. 4, the timeline of events during a send is explained. Since only the completion is traced, the use of the NIC to send out the said number of bytes is guaranteed. Also, as far as the user application is concerned, the Send through Tdi completed only when the IRP is completed in the socket driver (which may wake up the blocked thread in the case of synchronous i/o or trigger the appropriate event in the case of async i/o).

Tracing receives is more complex than Sends, in the sense that tracing information needs to be generated at more points than one. In the case of receive, we should not care if the TCP protocol sends out acks or if this is only part of a receive which got cancelled from the other end point. The number of bytes received must be accounted for exactly. We will first take the case of a pre-posted receive and how it is traced for capacity planning purposes.

Figure 5:
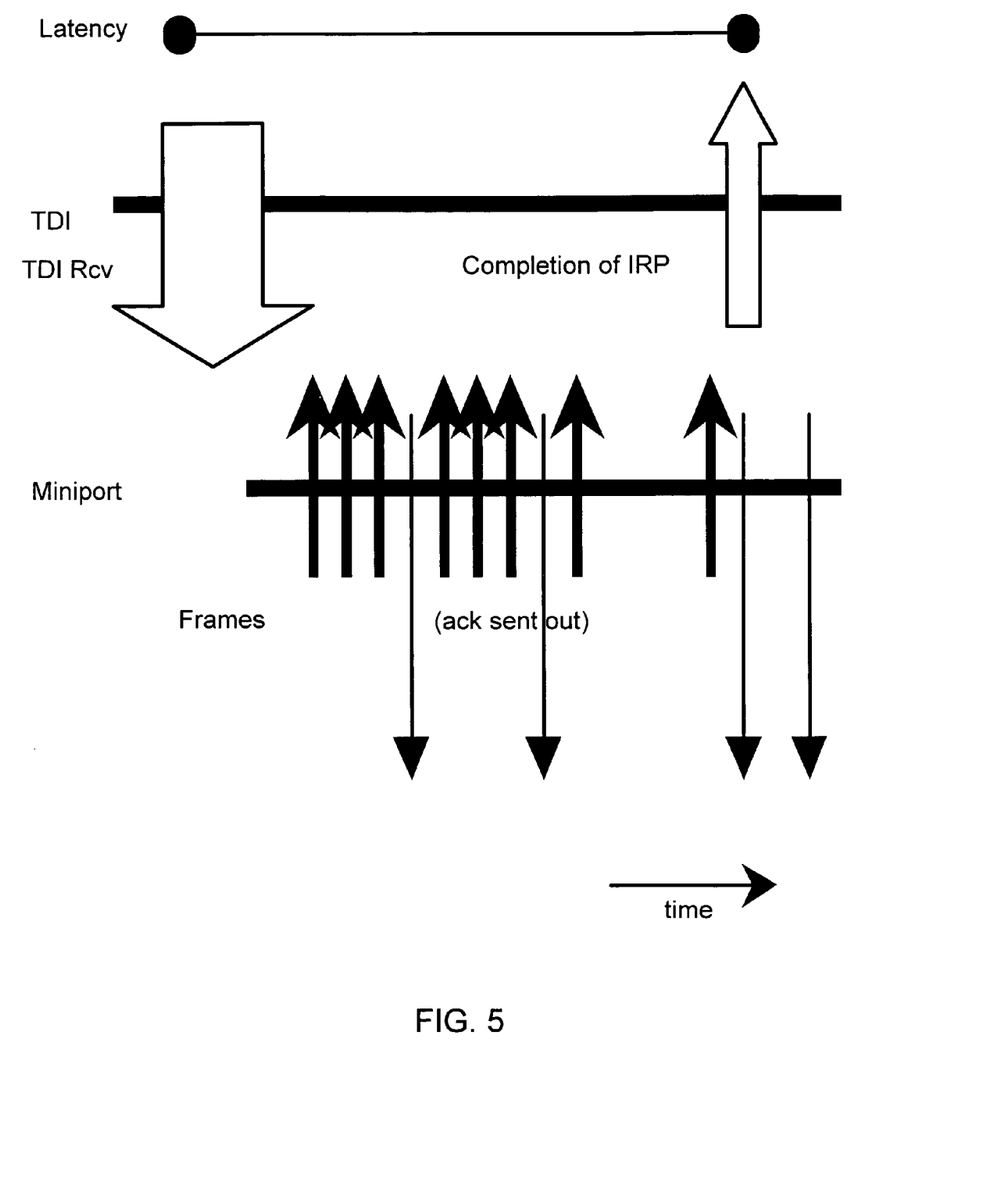
FIG. 5 is a timeline of a TCP receive.

In the case of pre-posted receives, TCP receives an IRP through TDI to receive a certain size. TCP caches this IRP in a Receive-Request structure. When a chunk of a certain size of data is received (could be less than the requested size, to improve latency) TCP completes the request with the then-available number of bytes and the appropriate buffers. If more needs to be received, the receiver (say application through socket interface) posts more receive-IRPs which are completed as frames are received. In FIG. 5, the receive completion and trace timing is explained.

It is possible to receive when no receives are posted. In such cases, the data is indicated to the receiver as soon as the first frame is received. If any more data needs to be received, TCP receives a piggybacked Irp. TCP generates a CP trace in this indicate path to accurately account for the accepted number of bytes.

Data Collection Issues

WINDOWS NT brand operating system uses a packet oriented I/O model for performing I/O operations to disks as well as to network devices. Whenever a user application or service posts a Send/Receive request, an IRP is created and sent to TCP. Typically the IRP is filled with the context of the thread requesting the operation. In the case of sends, it is possible to identify the correct user thread to charge the bandwidth utilization. In the case of receives, a DPC is generated in NDIS, which doesn't run in the context of any user thread. With respect to receives through the indicate-path described above, when the data is accepted without requesting more receives through IRPs, it is not possible to make a correspondence. In such cases however, the port information that is provided is useful in identifying the service.

What is Instrumented?

1. Send Complete event when a TCP send request is complete (when an ACK for the last byte of the Send Request is received). The source address, destination address, source port number, destination port number, bytes transmitted are also recorded. Events are automatically time-stamped by the trace logger.
2. Receive Indicate event when incoming data is indicated to the upper layers. The source address, destination address, source port and destination port numbers, the size of data received and the process Id of the Process that is being indicated by TCP.
3. Receive Complete event (when a receive-Irp is completed with data). Similar information is collected.

These three trace points cover the majority of the meaningful TCP traffic in the system. It is important to keep in mind that some TCP traffic is not accounted for by this instrumentation. For example, retransmissions from packet loss, receiving IP control msgs (like ICMP etc.).

Instrumentation Overhead

In comparison to other kernel events such as thread create or delete, network events are very high frequency events. As a result, extraordinary care has been taken to minimize the overhead of trace instrumentation. The data being collected is primarily from the Transport Control Block (TCB) structure. The fields in the TCB structure are arranged to make the data relevant to capacity planning in one contiguous block. This allows direct copying from the TCB structure to the Trace Buffers without having to make any intermediary copies. According to measurements obtained during preliminary testing, a network event uses about 128x86 instructions and logs 24 bytes of data. The actual results may vary, however.

Analysis of Sample Traces

Appendix A provides a sample kernel trace fragment from a TCP Send test, translated into readable text format. Each row in the table shows an event instance. Each event instance is described by the fixed header providing the event name, Thread ID that is causing the event, system clock time when the event happened, the kernel and user mode CPU time for the thread. Additional columns in the table show the event specific data associated with each event.

The tests were started after starting up the Trace logger using a command line utility called tracelog.exe. The trace shows the process start and end of the tracelog.exe. Next there is a process start for the TCP send test program (nttcp.exe). Immediately following that, the Tcp Send events can be seen. The source IP address/port and destination IP address/port can also be seen.

The size of transfers is 8 K bytes. The thread that's actually performing the send is (thread Id 0, a system thread). However, the process Id that was saved when the connection was created is 1C0, recorded with every send event. This process Id 1C0 corresponds to the nttcp.exe program that initiated the sends. Hence, it can be seen that the network traffic can be charged to processes properly from the traces.

While the TCPSend events triggered on the nttcp connection were in progress, an HTTP request for a webpage happened (shown in italics) and through threadID 39C, this request was handled by the IIS running on port 80 and 3 files were sent out to the HTTP remote browser. The HTTP transaction happened through a keep-alive connection. These events were charged to process 382 (InetInfo.exe).

Possible Uses of Network Traces

Classification by PID:
In summary, since stack event trace generated incorporates PID, it is possible to charge network traffic to a specific process or kernel mode service. Other possible modes of classification, such as per-service, per-NIC, per-remote-request or per-client are indicated in paragraphs below.

Classification of network utilization per Service:
From post-processing the collected trace information, it is possible to classify the bandwidth utilization by application/service. Services and user applications/connections can be characterized using the 4-tuple (SAddr, DAddr, Sport, Dport). The traces collected for the specific port show the utilization for a particular service. From the traces shown, it can be observed that (HTTP) web service active on port 80 can be charged for the receives and sends in italics.

Classification of network utilization per NIC:
Using tools such as IPConfig, it is possible to identify NICs and assigned IP addresses. Parsing the collected trace for a specific IP Source Address gives all the traffic for that particular NIC. It is possible that data rerouting can happen when a transfer is in progress. In such a case, TCP receives an indication and a special stack event trace is generated.

Classification of System resource utilization per remote request/client:
Since Disk I/O events are generated in the context of the process, and remote requests are charged to the same process (through stack event traces), it is possible to identify the running service to charge disk i/o operations to. Based on Destination IP addr, this can be further classified per client of the service.

CONCLUSION

With the introduction of Event Tracing for WINDOWS NT 5.0 brand operating system, the resource consumption of CPU, Memory (Page faults), Disk I/O and Network and be charged to applications or Services. This will make the task of capacity planning client/server applications running on WINDOWS NT brand operating system servers easier and more accurate.

We claim:

1. A method of tracing data traffic on a network, the method comprising:
   at the transport layer of a protocol stack residing on a first device in the network, detecting, upon the occurrence on an event, a transmission or receipt of data to or from a second device on the network as a transport control block entry related to the event, the event comprising:
     a send complete event, a receive indicate event, or a receive complete event; and
   in response to the transmission or receipt being detected, copying the transport control block entry related to the event from the transport control block to a trace log;
   wherein the trace log is accessible to determine the volume of data traveling over a network.

2. The method of claim 1, wherein the protocol stack is a TCP/IP stack.

3. The method of claim 1, further comprising detecting the presence of an input/output packet representing the transmission or receipt.

4. The method of claim 1, wherein the transmission of data is recorded at the completion of the transmission indicated by an acknowledgement from the first device.

5. The method of claim 1, wherein the entry related to the event comprises at least one of a source address, a destination address, a source port number, a destination port number, a number of bytes transmitted, a size of the data received, a process identification, an entry time, or a transmission time.

6. The method of claim 1, wherein the send complete event occurs when the first device receives an acknowledgement for a last byte of the transmission from the second device.

7. The method of claim 1, wherein the receive indicate event occurs when the protocol stack receives an input/output request packet through an interface.

8. The method of claim 1, wherein the receive complete event occurs when a request for data is completed.

9. A method of tracing a data transmission of data over a computer network comprising:
   detecting a transport-layer request to transmit the data transmission in a transport control block;
   searching the data transmission to determine an identity of a process that created the data transmission; and
   storing in a trace log a first entry representing the transport-layer request to transmit the data transmission;
   detecting an acknowledgment of the data transmission in a transport control block;
   storing in the trace log a second entry representing the acknowledgment of the data transmission;
   detecting a transport-layer reception of the data transmission in the transport control block;
   storing in the trace log a third entry representing receiving the data transmission;
   detecting a transport-layer completion of the data transmission in the transport control block;
   storing in the trace log a fourth entry representing the completion of the data transmission;
   wherein the first entry comprises the identity of the process; and
   wherein the trace log is accessible to determine a volume of data being transmitted over the network.

10. The method of claim 9, wherein the identity of the process includes a port number or an IP address relating to the transmission.

11. The method of claim 9, wherein the acknowledgement of the data transmission is detected when the last byte of the transport-layer request to transmit the data transmission is received.

12. The method of claim 9, wherein the transport-layer reception of the data transmission is detected when the transport layer receives the data transmission through an interface.

13. The method of claim 9, wherein the transport-layer completion of the data transmission is detected when the request to transmit the data transmission is completed.

14. The method of claim 9, wherein the first, second, third, and fourth entries comprise at least one parameter related to the data transmission, the at least one parameter related to the data transmission comprising a source address, a destination address, a source port number, a destination port number, a number of bytes transmitted, a size of the data received, a process identification, an entry time, or a transmission time.

15. A computer-readable medium having stored thereon computer-executable instructions for tracing data traffic on a network comprising:
   detecting a transport-layer request to transmit a data transmission to a port connection;
   searching the data transmission to determine an identity of a process that created the the data transmission; and
   storing in a trace log a first entry representing the transport-layer request to transmit the data transmission;
   detecting an acknowledgment of the data transmission in the transport control block;
   storing in the trace log a second entry representing the acknowledgment of the data transmission;
   detecting a transport-layer reception of the data transmission in the transport control block;
   storing in the trace log a third entry representing receiving the data transmission;
   detecting a transport-layer completion of the data transmission in the transport control block;
   storing in the trace log a fourth entry representing the completion of the data transmission;
   wherein the first entry comprises the identity of the process; and
   wherein the trace log is accessible to determine a volume of data being transmitted over the network.

16. The computer-readable medium of claim 15, having further computer-executable instructions comprising:
   opening the port connection by the process;
   creating a connection object representing the opening of the port connection by the process;
   copying the process identification from the connection object into a transport control block associated with the port; and
   in response to the detection of the receipt of data at the port connection, copying the process identification into the trace log from the transport control block.

17. The computer-readable medium of claim 15, wherein the acknowledgement of the data transmission is detected when the last byte of the transport-layer request to transmit the data transmission to the port is received.

18. The computer-readable medium of claim 15, wherein the transport-layer reception of the data transmission is detected when the transport layer receives the data transmission through an interface.

19. The computer-readable medium of claim 15, wherein the transport-layer completion of the data transmission is detected when the request to transmit the data transmission to the port is completed.

20. The computer-readable medium of claim 15, wherein the first, second, third, and fourth entries comprise at least one parameter related to the data transmission, the at least one parameter related to the data transmission comprising a source address, a destination address, a source port number, a destination port number, a number of bytes transmitted, a size of the data received, a process identification, an entry time, or a transmission time.

21. A computer system comprising:
a network;
a first computing device configured to send a transmission across the network to a second computing device;
a transport protocol stack residing on the first computing device configured to receive the transmission;
a transport control block communicating with the transport protocol stack, the transport control block configured to store at least one transport control block entry, the at least one transport control block entry comprising at least one transmission parameter; and
a trace logger comprising a trace log;
wherein the trace logger is configured to copy the at least one transmission parameter to the trace log from the transport control block, the at least one transmission parameter comprising information related to at least one of a send complete event, a receive indicate event, or a receive complete event; and
wherein the trace log is accessible to determine a volume of data being transmitted over the network.

22. The system of claim 21, wherein the at least one transmission parameter comprises at least one of a source address, a destination address, a source port number, a destination port number, a number of bytes transmitted, a size of the data received, a process identification, an entry time, or a transmission time.

23. The system of claim 21, wherein the send complete event occurs when the first device receives an acknowledgement for a last byte of the transmission from the second device.

24. The system of claim 21, wherein the receive indicate event occurs when the protocol stack receives an input/output request packet through an interface.

25. The system of claim 21, wherein the receive complete event occurs when a request for data is completed.

* * * * *